United States Patent [19]
Fletcher et al.

[11] 3,755,265
[45] Aug. 28, 1973

[54] HIGHLY FLUORINATED POLYURETHANES
[76] Inventors: James C. Fletcher, Administrator of the National Aeronautics and Space Administration with respect to an Invention of; Eugene C. Stump, Gainesville, Fla.; Stephen Eugene Rochow, Ann Arbor, Mich.
[22] Filed: Apr. 4, 1972
[21] Appl. No.: 241,061

Related U.S. Application Data
[63] Continuation-in-part of Ser. No. 770,417, Oct. 24, 1968, abandoned.

[52] U.S. Cl. ......................................... 260/77.5 AP
[51] Int. Cl. ............................................ C08g 22/14
[58] Field of Search .............................. 260/77.5 AP

[56] References Cited
UNITED STATES PATENTS
3,574,770   4/1971   Paine ........................... 260/77.5 AP Primary Examiner—Donald E. Czaja
Assistant Examiner—M. J. Welsh
Attorney—John R. Manning, Monte F. Mott and Wilfred Grifka

[57] ABSTRACT

Polyurethanes having the repeating unit:

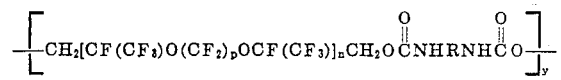

where
n is an integer of 1 to 12,
p is an integer of 2 to 23,
y is an integer of 1 to 1000, and
R is any radical suitable to link isocyanate groups and is preferably selected from the group consisting of alkylene and halogen substituted alkylene radicals of four to 12 C atoms, substituted and unsubstituted phenylene groups of up to 20 C atoms.

7 Claims, No Drawings

HIGHLY FLUORINATED POLYURETHANES

CROSS-REFERENCE TO RELATED APPLICATION

This application is a continuation-in-part of U.S. application Ser. No. 770,417 filed Oct. 24, 1968, now abandoned.

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The invention is in the field of polymers. More particularly, the invention relates to new highly fluorinated polyurethane polymers.

2. Description of the Prior Art

Polyurethane resins, also known as isocyanate resins, are a well known class of synthetic polymers. They may be either thermoplastic or thermosetting. The polyurethane resins are made into flexible or rigid foams and flexible and stiff fibers. They are also utilized as coatings, linings, and as elastomers. The polymer units are formed from the reaction of a diisocyanate with a diol. Polyethers have been the most important source of hydroxyl groups. One of the most popular polyethers utilized is polyoxypropylene. Toluene diisocyanate and diphenylmethane-4,4'diisocyanate are two of the more prevalent diisocyanates reacted to form the polyurethane resins.

In the herein invention, a perfluorinated hydroxy terminated polyether having the general formula

where $n$ is an integer of 1 to 12,
and $p$ is an integer of 2 to 23
is reacted with a diisocyanate to form the polyurethane. In U.S. Pat. No. 3,250,807, there is disclosed the basic monomeric ether structure utilized. However, the patent discloses the ether terminated with acid or acid fluoride groupings rather than hydroxyl groupings. In. U. S. Pat. No. 3,637,842 of Jan. 25, 1972, there is disclosed a method of polymerizing the ethers disclosed in the aforementioned patent such that n is equal to at least 2 to 12. Additionally, the copending application further discloses converting the acid fluoride terminated polyethers to hydroxy terminated ones. It is these hydroxy terminated perfluoropolyethers that are contemplated as the starting materials utilized herein. Though, as indicated, there are several polyurethane resins available on the commercial market, none would possess the same thermal properties, non-flammability and the like, of polyurethanes using perfluorinated ethers.

OBJECTS OF THE INVENTION

An object of this invention is to provide new polyurethane resins having improved oxidative stability.

Another object of this invention is to provide new polyurethane resins having outstanding chemical resistance and low temperature flexibility.

A further object of this invention is to provide highly fluorinated polyurethanes.

Other objects will be apparent from the following detailed description and examples.

BRIEF SUMMARY OF THE INVENTION

This invention relates to new polyurethanes having the formula:

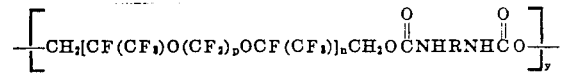

where
$n$ is an integer of 1 to 12,
$p$ is an integer of 2 to 23,
$y$ is an integer of 1 to 1000, and
R is any radical suitable to link isocyanate groups and is preferably selected from the group consisting of alkylene and halogen substituted alkylene radicals of four to 12 C atoms, substituted and unsubstituted phenylene groups of up to 20 C atoms.

The polyurethane results from the reaction of a diol having the formula $HOCH_2[CF(CF_3)O(CF_2)_pOCF(CF_3)]_nCH_2OH$, where p and n are as defined above, with a suitable diisocyanate such as tetrafluoro-m-phenylene diisocyanate. The formation of the final polyurethane product merely involves heating the two reactants over a wide temperature range for varying lengths of time to obtain products having different properties of hardness, strength and the like. The resultant polyurethanes can be used for films, sheets, seals, and many other applications where good chemical resistance, low temperature flexibility and non-flammability is desired. It is believed the invention will be further understood from the following detailed description and examples.

DESCRIPTION OF PREFERRED EMBODIMENTS

As indicated, the starting diol prepolymer material utilized to form the polyurethanes of this invention having the general formula

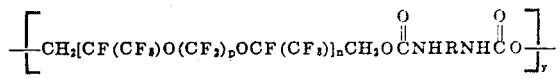

where
$n$ is an integer of 1 to 12,
$p$ is an integer of 2 to 23,
$y$ is an integer of 1 to 1000, and
R is any radical suitable to link isocyanate groups and is preferably selected from the group consisting of alkylene and halogen substituted alkylene radicals of four to 12 C atoms, substituted and unsubstituted phenylene groups of up to 20 C atoms, is disclosed in the above-mentioned U.S. Pat. No. 3,637,842. Briefly, these diols are derived from an acid fluoride terminated corresponding perfluoroether which has first been polymerized and then reduced to change the terminal groups from acid fluoride to hydroxyl. As indicated in the co-pending application, it is preferable that the diols have a molecular weight range of about 1500 to 2000 to provide ease of handling and to produce satisfactory end products.

The diisocyanate utilized has the general formula:
OCNRNCO where R is as defined in the above general formula for products of this invention. The halogen substitutions are generally either chlorine or fluorine atoms. The substituted phenylene groups include halogen substitutions, alkyl, aryl and alkaryl groups. To practice this invention, any diisocyanate previously and conventionally utilized to produce polyurethane resins is contemplated. Examples of conventional diisocyanates include toluene diisocyanate, including mixtures of its isomers such as the 2,4 and 2,6 isomer, diphenylmethane-4, 4'-diisocyanate and hexamethylene diisocyanate.

Particularly, it is desirable in the herein invention to utilize diisocyanates containing a maximum amount of fluorine atoms. The extremely good chemical resistance, non-flammability and the like can be attributable to the presence of fluorine atoms in the polymer chain. This, if the diisocyanate also contains a high substitution of fluorine atoms like the diol utilized, one obtains a polymer containing the desired content of fluorine. Thus, it is preferred to utilize diisocyanates such as tetrafluoro-m-phenylene diisocyanate, tetrafluoro-p-phenylene diisocyanate, and the like.

The resultant polymers of this invention will range from sticky semi-solids to tough brittle sheets, depending upon the amount of diisocyanate utilized in the extension and cross linking reaction that transpires between it and the diols. It should be noted that although the hardness of the resultant polymers increases with increasing ratio of diisocyanate to diol, the glass temperature of the resultant polyurethanes is not adversely affected. Thus, it is contemplated to utilize a mole ratio of diisocyanate to diol of from 1:1 up to about 3:1. The preferred mole ratio range of the diisocyanate to diol is between 1:1 and 2:1.

The time and temperature of the polymerization reaction is dependent upon the molecular weight of the prepolymer and the type of diisocyanate used. Completion of the polymerization for the given diol and diisocyanate can be determined by the increase in viscosity of the melt polymer. Generally, the temperature of curing can vary from 25° to 100°C, while the time of the cure can range from 10 to 30 minutes.

the good thermal, oxidative, and chemical resistance properties of other known highly fluorinated materials such as Teflon, which is tetrafluorethylene, yet are elastomeric materials and can be utilized as expulsion bladder materials, seals, gaskets, coatings and other similar application.

It is believed the invention will be better understood from the following detailed examples:

EXAMPLE I

A hydroxy terminated perfluoro polyether having the formula $HOCH_2[CF(CF_3)O(CF_2)_5OCF(CF_3)]_nCH_2OH$ and prepared in accord with the method described in the above mentioned U.S. Pat. No. 3,637,842 was utilized. This prepolymer had a molecular weight of about 1500. 10.5 grams or .0068 moles of the polyether was added together with 2.35 grams or .0101 mole of tetrafluoro-m-phenylene diisocyanate to a 100 ml. resin kettle equipped with a stirrer, $N_2$ inlet and outlet. The diisocyanate was previously prepared in accord with the procedure set forth by R. Gosnell and J. Hollander in the Journal of Macromolecular Science (Physics) B1(4), 831 (1967). After 20 minutes of stirring at room temperature, the reactants had balled about the stirrer. The material was then removed and placed in a press between 10 mil shims at 3000 psi and 160°C for ½ hour. This produced a yellow, flexible sheet of the resultant polymer. The glass transition temperature was −80°C and the Shore A hardness was 79.

The above was repeated varying the amounts of prepolymer and diisocyanates as well as the temperature and time of heating. Hydroxy terminated perfluoropolyether prepolymer of varying molecular weights ranging from 1500 to 2193 was utilized. The results of the various preparations indicating the glass transition temperature Tg and the Shore A hardness, together with an indication as to the type of product, are indicated in the following table:

TABLE I

Polyurethanes from $HOCH_2[CF(CF_3)O(CF_2)_5OCF(CF_3)]_nCH_2OH$ and Tetrafluoro-m-phenylene Diisocyanate

| Exp. No. | Prepolymer M. wt. | Grams prepolymer | Grams diisocyanate | Mole ratio diisocyanate/ prepolymer | Temp., °C. | Time (min.) | Glass temperature Tg (°C.) | Hardness [b] | Remarks |
|---|---|---|---|---|---|---|---|---|---|
| 160.1 | 2,193 | 10.63 | 2.24 | 2/1 | 150 | 90 | −73 | | Brown, flexible film. |
| 160.2 | 2,193 | 11.7 | 1.24 | 1/1 | 140 | 180 | | | Sticky, semi-solid. |
| 160.3 | 2,193 | 10.6 | 3.43 | 3/1 | 140 | 120 | | | Weak, elastomeric film. |
| 160.4 | 1,500 | 11.35 | 4.17 | 2.38/1 | 50-70 | | | | Brittle, yellow, slightly flexible sheet. |
| 160.5 | 1,500 | 9.90 | 1.82 | 1.2/1 | 55-80 | | | | Weak, elastomeric solid. |
| 160.6 | 1,500 | 10.1 | 1.56 | 1/1 | 39 | 30 | −5 | 59 | Yellow, elastomeric film, decomposes at 234°.[a] |
| 160.7 | 1,500 | 9.05 | 2.10 | 1.5/1 | 25-30 | 10 | | | Yellow, elastomeric sheet. |
| 160.8 | 1,500 | 11.25 | 2.09 | 1.2/1 | 25-30 | | −16 | 62 | Do. |
| 160.9 | 1,500 | 10.15 | 2.35 | 1.5/1 | 25-30 | 20 | −80 | 79 | Yellow, flexible sheet. |
| 160.10 | 1,500 | 10.0 | 3.09 | 2/1 | 25-30 | 10 | −79 | 90 | Yellow slightly flexible sheet. |

[a] By differential scanning calorimeter.
[b] Shore A.

It can be appreciated that the end groups of the polymers of this invention are not readily determined. The polymers can be hydroxy or isocyanate terminations, depending upon the stoichiometry of the reaction, reaction conditions, and the like. Further, since the resultant higher polyurethanes formed are infusible, one cannot determine their molecular weight through available techniques. Thus, a practical upper limit of y = 1000 is given in the general formula for the products, though the infusible polymers resulting could well have a weight significantly less than that.

As can be seen, the polymers of this invention provide highly fluorinated structures which have many of Though the materials prepared in the foregoing table were all pressed to form sheets of the polymer of this invention, it should be understood that the material can be formed into various other shapes such as seals, hoses and various forms of coatings.

What is claimed is:

1. Polyurethanes having the repeating unit:

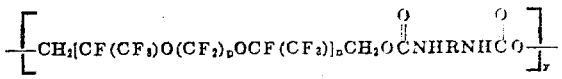

where n is an integer of 1 to 12, $p$ is an integer of 2 to 23,
$y$ is an integer of 1 to 1000, and
R is any radical suitable for linking isocyanate groups.

2. The polyurethane of claim 1 where R is selected from the group consisting of alkylene and halogen substituted alkylene groups of four to 12 C atoms, substituted and unsubstituted phenylene groups of up to 20 C atoms.

3. A polyurethane formed from the reaction at a 1:1 to 3:1 mole ratio of a diisocyanate with a diol having the formula:

$$HOCH_2[CF(CF_3)O(CF_2)_pOCF(CF_3)]_nCH_2OH$$

where
$n$ is from 1 to 12 and
$p$ is from 2 to 23.

4. The polyurethane of claim 3 where the mole ratio of diisocyanate to diol is from 1:1 to 2:1.

5. The polyurethane of claim 3 where the diisocyanate has the general formula:
OCNRNCO, where
R is selected from the group consisting of alkylene and halogen substituted alkylene groups of four to 12 C atoms, substituted and unsubstituted phenylene groups of up to 20 C atoms.

6. The polyurethane of claim 3 wherein the diisocyanate is selected from the class consisting of tetrafluoro-m-phenylene diisocyanate and tetrafluoro-p-phenylene diisocyanate.

7. The polyurethane of claim 3, where $p = 5$.

* * * * *